US006853124B1

(12) United States Patent
Vollkommer et al.

(10) Patent No.: US 6,853,124 B1
(45) Date of Patent: Feb. 8, 2005

(54) FLAT FLUORESCENT LAMP WITH SPECIFIC ELECTRODE STRUCTURING

(75) Inventors: Frank Vollkommer, Buchendorf (DE); Lothar Hitzschke, Munich (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/483,761

(22) Filed: Jan. 14, 2000

Related U.S. Application Data

(62) Division of application No. 09/180,861, filed as application No. PCT/DE98/00827 on Mar. 20, 1998, now Pat. No. 6,034,470.

(30) Foreign Application Priority Data

Mar. 21, 1997 (DE) ........................................ 197 11 890
Jul. 8, 1997 (DE) ........................................ 197 29 181

(51) Int. Cl.$^{7}$ .......................... H01J 61/00; G02F 1/335

(52) U.S. Cl. ....................... 313/485; 313/491; 313/493; 349/70

(58) Field of Search ................ 313/309–311, 553–555, 313/336, 495–497; 362/29, 235, 249, 318; 349/69–71; 345/50, 87

(56) References Cited

U.S. PATENT DOCUMENTS 4,389,277 A 6/1983 Devries ...................... 156/630
5,073,743 A 12/1991 Kajiwara .................... 313/346
5,266,865 A 11/1993 Haizumi et al. ............ 313/506
5,319,282 A * 6/1994 Winsor .................... 315/169.4
5,343,116 A 8/1994 Winsor ....................... 313/493
5,424,857 A 6/1995 Aoki et al. .................... 359/59
5,463,274 A 10/1995 Winsor ....................... 313/493
5,525,861 A 6/1996 Banno et al. ............... 313/495
5,645,337 A * 7/1997 Gleckman .................... 362/29
5,850,122 A 12/1998 Winsor ....................... 313/493
5,982,090 A * 11/1999 Kalmanash ................. 313/493
6,011,528 A * 1/2000 Inbar et al. .................... 345/77
6,034,470 A * 3/2000 Vollkommer et al. ....... 313/485

FOREIGN PATENT DOCUMENTS

| | | | |
|---|---|---|---|
| DE | 195 26 211 | 1/1997 | ........... H05B/41/24 |
| DE | 195 48 003 | 6/1997 | ............ H03K/3/53 |
| EP | 0363832 | 4/1990 | ............ H01J/65/00 |
| EP | 0607453 | 7/1994 | ............ G02B/6/00 |
| FR | 2 668 634 | 4/1992 | ........... G09F/9/313 |
| GB | 2079045 | 1/1982 | ............ H01J/61/06 |
| GB | 2079046 | 1/1982 | ............ H01J/61/06 |
| WO | WO 94/04625 | 3/1994 | .......... C09J/123/16 |
| WO | WO 94/23442 | 10/1994 | ............ H01J/41/29 |
| WO | WO 97/04625 | 2/1997 | ........... H05B/41/29 |

OTHER PUBLICATIONS

*Patent Abstracts of Japan*, v. 007, n. 286 (P–244), Dec. 21, 1983, & JP 58 160926 A (Sharp KK), Sep. 24, 1983.

*Patent Abstracts of Japan*, v. 017, n. 290 (P–1549), Jun. 3, 1993, & JP 05 019302 A (Toshiba Corp.), Jan. 29, 1993.

* cited by examiner

*Primary Examiner*—Ashok Patel
(74) *Attorney, Agent, or Firm*—Robert F. Clark

(57) ABSTRACT

A flat fluorescent lamp (1) has a discharge vessel (2) having a base plate (7), a top plate (8) and a frame (9) which are connected to one another in a gas-tight fashion by means of solder (10). Structures resembling conductor tracks function in the interior of the discharge vessel as electrodes (3–6), in the feedthrough region as feedthroughs, and in the external region as external supply leads (13; 14). Flat lamps of the most different sizes can thereby be produced simply in engineering terms and in a fashion capable of effective automation. Moreover, virtually any electrode shapes can be realized, in particular optimized with regard to a uniform luminous density with a reduced drop in luminous density towards the edges of the flat lamp. At least the anodes (5, 6) are covered in each case with a dielectric layer (15). The lamp (1) is preferably operated by means of a pulsed voltage source and serves as background lighting for LCDs, for example in monitors or driver information displays.

4 Claims, 8 Drawing Sheets

III-III

FLAT FLUORESCENT LAMP WITH SPECIFIC ELECTRODE STRUCTURING

CROSS REFERENCES TO RELATED APPLICATIONS

This application is a division of copending application Ser. No. 09/180,861, filed Nov. 17, 1998, now U.S. Pat. No. 6,034,480, which is a 371 of PCT/US98/00827, filed Mar. 20, 1998, incorporated herein by reference.

TECHNICAL FIELD

The invention relates to a flat fluorescent lamp for background lighting. Moreover, the invention relates to a lighting system having this flat fluorescent lamp. Furthermore, the invention relates to a liquid crystal display device having this lighting system.

The designation "flat fluorescent lamp" is understood here to mean fluorescent lamps having a flat geometry and which emit white light. They are first and foremost designed for background lighting of liquid crystal displays, also known as LCDs.

Also at issue here are flat lamps having strip-like electrodes, in which either the electrodes of one polarity or all the electrodes, that is to say of both polarities, are separated from the discharge by means of a dielectric layer (discharge dielectrically impeded at one end or two ends). Such electrodes are also designated as "dielectric electrodes" below for short.

The term "strip-like electrode" or "electrode strip" for short is to be understood here and below as an elongated structure which is very thin and narrow by comparison with its length and is capable of acting as an electrode. The edges of this structure need not necessarily be parallel to one another in this case. In particular, substructures along the longitudinal sides of the strips are also to be included.

The dielectric layer can be formed by the wall of the discharge vessel itself by arranging the electrodes outside the discharge vessel, for example on the outer wall. An advantage of this design with external electrodes is that there is no need to lead gas-tight electrical feedthroughs through the wall of the discharge vessel. However, the thickness of the dielectric layer—an important parameter which, inter alia, influences the starting voltage and the operating voltage of the discharge—is essentially fixed by the requirements placed on the discharge vessel, in particular the mechanical strength of the latter.

On the other hand, the dielectric layer can also be realized in the shape of an at least partial covering or coating, at least of the anodic part of the electrodes arranged inside the discharge vessel. This has the advantage that the thickness of the dielectric layer can be optimized with regard to the discharge characteristics. However, internal electrodes require gas-tight electrical feedthroughs. Additional production steps are thereby required, and this generally increases the cost of production.

Liquid crystal display devices are used, in particular, in portable computers (laptop, notebook, palmtop or the like), but recently also for stationary computer monitors. Further fields of application are information displays in control rooms of industrial plants or flight control equipment, displays of point-of-sale systems and automatic cash dispensing systems as well as television sets, to name but a few. Liquid crystal display devices are also being used increasingly in automotive engineering for so-called driver information systems. Liquid crystal display devices require background lighting which illuminates the entire liquid crystal display as brightly and uniformly as possible.

PRIOR ART

WO 94/23442 discloses a method for operating an incoherently emitting radiation source, in particular a discharge lamp, by means of dielectrically impeded discharge. The operating method provides for a sequence of effective power pulses, the individual effective power pulses being separated from one another by dead times. Consequently, a multiplicity of individual discharges, which are delta-like (Δ) in top view, that is to say at right angles to the plane in which the electrodes are arranged, burn in each case between neighbouring electrodes of differing polarity. These individual discharges are lined up next to one another along the electrodes, widening in each case in the direction of the (instantaneous) anode. In the case of alternating polarity of the voltage pulses of a discharge dielectrically impeded at two ends, there is a visual superimposition of two delta-shaped structures. Since these discharge structures are preferably generated with repetition frequencies in the kHz band, the observer perceives only an average discharge structure corresponding to the temporal resolution of the human eye, for example in the form of an hour-glass. The number of the individual discharge structures can be influenced, inter alia, by the electric power injected. A further advantage of this pulsed mode of operation is a high efficiency in generating radiation. This mode of operation is likewise suitable for flat lamps of the type outlined at the beginning, as has already been documented in WO 94/04625.

To be precise, WO 94/04625 has disclosed a flat radiator which is operated according to the operating method of WO 94/23442. Because of the very efficient mode of operation, the flat radiator produces relatively low heat losses. In the exemplary embodiments, strip-shaped electrodes are arranged in each case on the outer wall of the discharge vessel, with the disadvantages outlined at the beginning. A further disadvantage of this solution is that the surface luminous density drops sharply towards the edge. The reason for this is, inter alia, the missing contributory radiation at the edge from the neighbouring regions outside the discharge vessel. Moreover, the individual discharges preferentially are formed between the anodes and only one of the two respectively directly neighbouring cathodes. Evidently, individual discharges do not form simultaneously on both sides of the anode strips independently of one another. Rather, it cannot be predicted by which of the two neighbouring cathodes the discharges will be formed in each case. Referring to the flat radiator as a whole, this results in a non-uniform discharge structure, and consequently in a temporally and spatially non-uniform surface luminous density.

A uniform surface luminous density is, however, desirable for numerous applications of such radiators. Thus, for example, the background lighting of LCDs requires a visual uniformity whose depth of modulation does not exceed 15%.

DE 195 48 003 A1 specifies a circuit arrangement with the aid of which unipolar voltage pulse sequences can be generated such as are required, in particular, for the efficient operation of discharges dielectrically impeded at one end. Smooth pulse shapes with low switching losses are also achieved with loads—such as dielectrically impeded discharge arrangements—which act in a predominantly capacitive fashion.

EP 0 363 832 discloses, inter alia, a UV high-power radiator having strip-shaped electrodes which are arranged on the inner wall of the base plate of the discharge vessel. However, there are no data concerning the electrical feedthroughs for connecting the internal electrodes to a voltage source. The UV high-power radiator is operated by means of a sinusoidal AC voltage. It is known in the case of operation by AC voltage that the achievable UV yields are limited to less than approximately 15%. However, higher yields are required for efficient background lighting of LCD systems. Also specified, moreover, is an exemplary embodiment having cooling ducts integrated in the base plate, something which is impractical for many applications, in particular in the office environment and in mobile use.

EP 0 607 453 discloses a liquid crystal display having a surface lighting unit. The surface lighting unit essentially comprises a plate-shaped optical conductor and at least one bent tubular fluorescent lamp. The fluorescent lamp is arranged according to the bend on two or more mutually abutting edges of the optical conductor plate. As a result, the light of already one fluorescent lamp is launched at the at least two edges into the optical conductor plate and scattered by the plate surface facing the liquid crystal display. The aim of this measure is to achieve good illumination without the need for a corresponding large number of lamps. The disadvantage of this solution is that it is not possible to dispense with an optical conductor plate. Furthermore, external reflectors are additionally provided along the lamps, and these reflect a part of the lamp light laterally into the optical conductor plate. Nevertheless, unavoidable launching and scattering losses which reduce the achievable surface luminous density are produced in the redistribution from the linear light source (tubular fluorescent lamp) into the flat light source (optical conductor plate) Moreover, the service life of the surface lighting unit is limited by the fluorescent lamps. In the case of the use of a plurality of fluorescent lamps, the vulnerability of the entire unit grows increasingly.

Further disadvantages in the case of fluorescent lamps based on mercury low-pressure discharges result from the properties of the mercury itself. Firstly, the mercury must first reach its operating vapour pressure, that is to say such fluorescent lamps exhibit a pronounced starting performance, something which makes it look rather inadvisable to turn off a PC monitor equipped therewith during a work break. Moreover, mercury is injurious to health and must therefore be disposed of as hazardous waste.

REPRESENTATION OF THE INVENTION

It is an object of the present invention to provide a flat fluorescent lamp with strip-like internal electrodes which has an electrode structure and electrical feedthroughs in such a way that the flat radiator 25 largely independently of the size and thus of the number of electrodes—can be produced in relatively few production steps and thus cost-effectively. A further aspect is the configuration, which is simple in terms of production engineering, of the electrode structures, which renders it possible to realize flat fluorescent lamps having an increased and uniform surface luminous density in a cost-effective fashion.

The basic idea of the first part of the invention consists in constructing the internal electrodes including the feedthroughs and external supply leads as three functionally different sections of in each case a single continuous cathode-side or anode-side structure resembling a conductor track.

It is possible by means of this concept to produce the three said functionally differing parts—internal electrodes, feedthroughs and external supply leads—as it were, simultaneously in a common production step, preferably by means of printing technology. By contrast with the prior art, the number of steps of manipulation and production is thereby greatly reduced. Furthermore, connections by means of soldering or the like between the individual components are eliminated.

Furthermore, the two structures offer the advantage of being able to be shaped in a virtually arbitrary fashion. As a result, the shapes of the electrodes which are optimized for a uniform surface luminous density up to the edges can be realized in a simple and cost-effective way in terms of production engineering. For example, only a structured printing screen need be appropriately configured for this purpose. A further advantage of the invention is that the design concept permits the cost-effective production of flat fluorescent lamps of virtually any size, since all the production steps can always be realized in the same way virtually independently of the size of the radiator. Consequently, suitable flat lamps for background lighting of liquid crystal displays of different sizes can be realized economically. Further advantages are the high luminous density and the high light yield, a typical specific light intensity being approximately 8 cd/W for a lamp including an optical diffuser. A range of further advantages of the flat lamps in conjunction with the pulsed mode of operation is set forth below. Since dielectrically impeded discharges operated in a pulsed fashion have a positive current-voltage characteristic, it is possible to arrange an arbitrary number of individual discharges next to one another, so that flat lamps of virtually any size can be realized in principle. Moreover, these flat lamps can be operated using only one electric ballast. Since the filling of the lamp contains no mercury, a threat due to poisonous mercury vapours is excluded and the problem of disposal is eliminated. A further advantage of the mercury-free filling is the instant start of the lamp without a starting performance. Because of the layer-like electrode structure without filigree individual parts, the lamp is, in addition, extremely robust and has a long service life.

According to the invention, the discharge vessel is constructed from a base plate and a top plate which are interconnected to form a closed discharge vessel by a frame and by means of solder, for example glass solder. On the inner wall of the discharge vessel, strip-like electrodes are applied directly in a gas-tight fashion to the base plate and/or top plate—in a fashion similar to conductor tracks applied to an electric printed circuit board—for example by vapour deposition, by means of silk-screen printing with subsequent burning in, or similar techniques.

The electrode strips are in each case guided outwards in a gas-tight fashion with one end through the solder. The seal between the feedthrough and frame and between the frame and base plate or top plate is performed by the solder.

In order to keep stresses due to different thermal expansions low, and to ensure gas-tightness even during continuous operation, the materials for the solder and frame as well as the base plate and top plate are tailored to one another. Moreover, the thicknesses of the preferably metal electrode strips are selected to be so thin that, on the one hand, the thermal stresses remain low and that, on the other hand, the current intensities required during operation can be realized.

In this case, a sufficiently high current carrying capacity of the conductor tracks requires a particular importance since the high luminous intensities aimed at for such flat lamps finally require high current intensities. To be precise, in the case of flat fluorescent lamps for background lighting of liquid crystal displays (LCD), a particularly high luminous intensity is mandatory because of the low transmission of such displays of typically 6%. This problem is further heightened in the case of the preferred pulsed mode of operation of the discharge, since particularly high currents flow in the conductor tracks during the relatively short duration of the repetitive injection of effective power. It is only in this way that it is also possible to inject sufficiently high average effective powers and thereby to achieve the desired high luminous intensity on average over time.

Relatively thick conductor tracks are used in order to ensure the abovementioned high current carrying capacity. Specifically, excessively low conductor track thicknesses run the risk of the formation of cracks because of local overheating of the conductor tracks. The heating of the conductor tracks by the ohmic component of the conductor track current is the greater the smaller the cross-section of the conductor tracks. The width of the conductor tracks is, however, subject to limits, inter alia because with increasing width there is likewise an increase in the shading of the luminous area of the flat radiator by the conductor tracks. Consequently, the aim is rather conductor tracks which are narrow, but for this reason as thick as possible, in order to solve the problem of the formation of cracks because of the development of heat by high current densities in the conductor tracks. Typical thicknesses for conductive silver strips are in the region of 5 $\mu$m to 50 $\mu$m, preferably in the region of 5.5 $\mu$m to 30 $\mu$m, particularly preferably in the region of 6 $\mu$m to 15 $\mu$m.

However, with conductor tracks of such thicknesses on relatively extended flat substrate materials such as are used in flat lamps, formation of cracks is to be expected due to material stresses which can result, for example, from the bending loads upon evacuation of the discharge vessel during the production process. The reason for the growing risk of the formation of cracks is the functional dependence of the yield point $\epsilon$ of a layer on the thickness d thereof in accordance with $\epsilon\infty\sqrt{d}$. In accordance therewith, the yield point is the smaller the greater the layer thickness. Moreover, with increasing layer thickness the probability of discontinuities inside the layer rises dramatically. These discontinuities lead to locally increased tensile stresses inside the layer. This leads, finally, to the risk that the layer will peel off from the substrate material.

It has proved, surprisingly, that flat lamps can nevertheless be produced in a gas-tight fashion with conductor tracks of such thicknesses, and that, moreover, the service life can by all means amount to a few thousand hours.

It is possible that a contribution is also made to this by support points specifically arranged at a suitable spacing from one another between the base plate and top plate, for example in the form of glass balls which lend the flat radiator sufficient bending stability without causing unacceptably strong shading.

According to the current state of knowledge, the two parameters $P_1=d_{Sp}\cdot d_{E1}$ and $P_2=d_{Sp}/d_{P1}$, inter alia, are regarded as relevant for the service life of the flat radiator, as being the spacing of the support points from one another or from the delimiting side wall, $d_{E1}$ denoting the thickness of the electrode tracks, and $d_{p1}$ denoting the smaller of the two thicknesses of the base plate or top plate. Typical values for $P_1$ are in the region of 50 mm $\mu$m to 680 mm $\mu$m, preferably in the region of 100 mm $\mu$m to 500 mm $\mu$m, particularly preferably of 200 mm $\mu$m to 400 mm $\mu$m.

Typical values for $P_2$ are in the region of 8 to 20, preferably in the region of 9 to 18, particularly preferably in the region of 10 to 15.

Good results were achieved, for example, with 10 $\mu$m thick printed silver layers and with glass balls fitted by means of glass solder between an in each case 2.5 mm thick base plate and top plate at a mutual spacing of approximately 34 mm. These values result in $P_1$=340 mm $\mu$m and $P_2$=13.6.

As already mentioned, against the background of the risk of formation of cracks it is advantageous in principle for the large cross-sectional areas of the conductor tracks which are likewise necessary because of the required high current carrying capacity also to be realized by means of an appropriate width of the conductor tracks instead of principally by means of a large thickness. Particularly if electrodes are arranged both on the base plate and on the top plate, that is to say therefore also on the inside of the primary luminous area of the flat radiator, the problem of shading by the conductor tracks themselves can be at least alleviated as follows.

For this purpose, the anodes and/or cathodes are assembled in each case from two mutually coupled electrically conductive components. The first component is constructed as a relatively narrow strip, but in turn consists of a material with a high current carrying capacity, preferably of metal, for example gold or silver. The second component is designed as a strip which is wider by comparison with the first component. In return it is selected specifically from a material which is substantially transparent to visible radiation, for example from indium tin oxide (ITO). Because of the larger width of the strip thereby possible, the result is that despite a possibly lower electrical conductivity the second component finishes up with a current carrying capacity which is likewise sufficient. The two components are in electrical contact with one another. A sufficiently large electrode area—an important parameter for the dielectrically impeded discharge—is also realized in this way.

In one variant, the two components are separated electrically from one another by a dielectric. The coupling between the two components is performed capacitively. The second component is preferably arranged closer to the interior of the discharge vessel than the first component. Moreover, only the first component is extended to the outside as a feedthrough and supply lead. The second component serves in this case merely to enlarge the effective electrode area inside the discharge vessel.

At least the inner wall of the top plate is coated with a mixture of fluorescent materials which converts the UV/VUV radiation of the gas discharge into white light during operation. In order to be able to convert as large a component as possible of the UV/VUV radiation, that is to say in order to maximize the light flux, the inner wall of the discharge vessel is completely coated with the mixture of fluorescent materials, that is to say the top plate, frame and base plate are thus coated.

The external supply leads are arranged on an external edge of the base and/or top plate and/or of the frame. For this purpose, the base and/or the top plate is or are, as the case may be, extended beyond the frame, at least on the sides of the flat lamp at which the feedthroughs lead outwards from the interior of the discharge vessel.

Outside the discharge vessel, the electrode strips terminate after the feedthrough region in a number of external supply leads corresponding to the number of electrode strips. Thus, seen per se, each electrode strip is constructed as a structure resembling a conductor track which in each case comprises the three following, functionally differing subregions: internal electrode region, feedthrough region and external supply lead region.

The connection of the supply leads of the same polarity to the two poles of a pulsed voltage source is performed, for example, with the aid of a suitable plug/cable combination.

In addition, the electrode strips of the same polarity can merge in each case into a common, bus-like external supply lead. In operation, these two external supply leads can be connected direct to one pole each of the voltage source. In this case, a special plug/cable combination can be dispensed with.

In a first embodiment, the strip-like electrodes are arranged next to one another on the base plate (Case I). This produces in operation an essentially plane-like discharge structure. The advantage is that shadows owing to the electrodes on the shining top plate are avoided. Instead of a single anode strip, as previously, two mutually parallel anode strips, that is to say an anode pair, are arranged in each case between the cathode strips. The result of this is to eliminate the problem outlined at the beginning that, in the quoted prior art, in each case only individual discharges of one of two neighbouring cathode strips burn in the direction of the individual anode strips situated therebetween.

In one variant, the two anode strips of each anode pair are widened in the direction of their respective two narrow sides. An increasing electric current density is achieved along the widening, and thus also an increasing luminous density of the individual discharges. The advantage is a relatively uniform luminous density distribution up to the edges of the flat lamp.

The anode strips are widened asymmetrically, with respect to their longitudinal axis, in the direction of the respective anodic partner strip. Owing to this measure, the respective spacing from the neighbouring cathode remains constant throughout despite widening of the anode strips. Consequently, during operation the ignition conditions for all the individual discharges are also the same along the electrode strips. It is ensured thereby that the individual discharges are formed in a fashion lined up along the entire electrode length (assuming an adequate electric input power).

The anode strips can likewise be widened in the direction of the respective neighbouring cathode without the advantageous effect of the widening being lost in principle. However, in this case the widening is only relatively weakly formed. This prevents the discharges from forming exclusively at the point of maximum width of the anode strip, that is to say at the point of the striking distance which is shortest in this case. The widening is distinctly smaller than the striking distance, typically approximately one tenth of the striking distance. Furthermore, both widening variants can also be combined, that is to say the widening is then formed both in the direction of the respective anode partner strip and in the direction of the neighbouring cathode The electrode structure for a discharge impeded at two ends is preferably designed symmetrically, since in this case the polarity of the electrodes changes. Consequently, each electrode acts alternately as anode or cathode. The principle relationships of the structure are represented diagrammatically in FIG. 1. The entire structure 100, which resembles a conductor track, comprises a first part 101 and a second part 102. The two parts 101, 102 have the already described double anode strips 103*a* and 103*b* or 104*a* and 104*b*, the double anode strips 103*a,b* of the first part 101 and the double anode strips 104*a,b* of the second part 102 of the structure being arranged alternately next to one another. The two parts 101, 102 of the electrode structure are covered with a dielectric layer (not represented). At their ends alternately opposite one another, the double anode strips 103*a,b* or 104*a,b* open into bus-like external supply leads 105; 106. In operation, the two external supply leads 105; 106 are connected to one pole each of the voltage source (not represented).

In one variant for a discharge impeded at one end or two ends and having unipolar voltage pulses, the cathode strips have for the individual discharges root points which are specifically spatially preferred. To illustrate the principle of the relationships, the electrode structure is represented diagrammatically in FIG. 2 for a flat lamp having a diagonal of 6.8". The anode-side structure 107 has the double anode strips 108*a* and 108*b*, which have already been mentioned several times. One individual anode strip 109 and 110 each form the two-ended termination of the anode-side structure 107. In the case of the cathode strips 111 of the cathode-side structure 112, the preferred root points are realized by nose-like extensions 113 facing the respectively neighbouring anode strips. As a result of them, there are locally limited intensifications in the electric field and, consequently, the delta-shaped individual discharges (not represented) ignite exclusively at these points 113. As a result, during operation a uniform distribution of the individual discharges can be forced, as it were, inside the flat discharge vessel. Without the extensions, the individual discharges would increasingly be displaced into the upper region of the flat lamp during vertical operation because of the convection. The extensions are preferably arranged more densely in a spatially increasing fashion in the direction of the respective two narrow sides of the strip-like cathodes (not represented; compare FIG. 3*a*). The advantage, in turn, is a relatively uniform luminous density distribution up to the edges of the flat lamp, that is to say a remedy is thereby effectively found for the disadvantage, mentioned at the beginning, of the drop in luminous density at the edge in the prior art. The anode strips 109*a,b* and cathode strips 111 open at their alternately opposite ends into an anode-side 114 or cathode-side 115 bus-like external supply lead. In operation, the anode-side supply lead 114 is connected to the positive pole (+) and the cathode-side supply lead 115 is connected to the negative pole (–) of a voltage source (not represented) supplying unipolar voltage pulses.

Furthermore, in one embodiment, the feature of the widening of the double anode strips can also be combined with the feature of the increased density of the cathode extensions.

In a further embodiment, anode strips and cathode strips are arranged on different plates (Case II). During operation, the discharges consequently burn from the electrodes of one plate through the discharge space to the electrodes of the other plate. In this arrangement, each cathode strip is assigned two anode strips in such a way that, viewed in cross-section with respect to the electrodes, the imaginary connection of cathode strips and corresponding anode strips respectively yields the shape of a “V”. The result of this is that the striking distance is greater than the spacing between the base plate and top plate. As has been found, it is possible using this arrangement to achieve a higher UV yield than if anodes and cathodes are arranged alternately next to one another on only one plate. According to the present state of knowledge, this positive effect is ascribed to reduced wall losses. The double anode strips are preferably arranged on the top plate, which serves primarily to couple out light, and the cathode strips are arranged on the base plate. The advantage is the low shading of the useful light emitted by the top plate, since the anode strips are designed to be narrower than the cathode strips.

In the case of the type II flat lamp, the previously explained bipartite electrodes can be used with particular advantage to reduce the shading effect. For this purpose, it is advantageous for at least the anode strips to be assembled in each case from a narrow high-current component and a wide transparent component.

Furthermore, it is also advantageous for Case II when the cathode strips have extensions, as in Case I. Moreover, an increased density of these extensions and/or a widening of the anode strips towards the edge of the flat lamp are advantageous for as small as possible a drop in luminous intensity at the edge.

Furthermore, it is advantageous to apply a light-reflecting layer, for example. $Al_2O_3$ and/or $TiO_2$, to the base plate. This prevents a part of the white light which is emitted by the layer of fluorescent material by the conversion of the UV/VUV radiation from being transmitted through the base plate and being lost for the useful direction through the base plate.

Located in the interior of the discharge vessel is an inert gas, preferably xenon and, possibly, one or more buffer gases, for example argon or neon. The internal pressure is typically approximately 10 kPa to approximately 100 kPa.

Particularly for relatively large flat lamps, it is appropriate under some circumstances to insert balls made from an electrically insulating material, for example glass, as spacers or support points between the base plate and top plate. This increases the mechanical stability and reduces the danger of implosion owing to the pressure difference between the inside and outside. It is expedient to fix the balls by means of solder. Moreover, it is advantageous also to provide the support points with a reflecting layer and a layer of fluorescent material, in order to maximize the luminous density of the flat lamp.

Also being claimed is a lighting system which comprises the abovementioned novel flat lamp and a pulsed voltage source.

The lighting system according to the invention is completed by a pulse voltage source whose output terminals are connected to the external supply leads of the electrodes of the discharge vessel and which supply a train of voltage pulses during operation. A suitable circuit arrangement for generating unipolar pulsed voltage trains is described in German Patent Application P 195 48 003.1. The lighting system can also be operated using unipolar and bipolar pulsed voltages, as are generated, for example, by the circuit disclosed in WO96/05653.

Furthermore, a liquid crystal display device is claimed which uses the abovementioned lighting system as background lighting for the liquid crystal display.

The liquid crystal display device according to the invention in turn uses this lighting system as background lighting for the liquid crystal display. For this purpose, the device contains a receptacle in which the liquid crystal display including the electronic control system for driving the liquid crystal display, as well as the lighting system are arranged. The lighting system and the liquid crystal display are in this case orientated relative to one another such that the top plate of the flat lamp of the lighting system lights the rear of the liquid crystal display. As an option, an optical diffuser is arranged between the flat lamp and the liquid crystal display. Said diffuser serves the purpose of smoothing the non-uniformities in the surface luminous density of the flat lamp. This is advantageous particularly in the case of large-area displays, in order to balance shadows caused by the glass balls functioning as support points. Moreover, so-called light amplifying films, also known as BEF (Brightness Enhancement Film), are optionally arranged between the flat lamp and the liquid crystal display or, if appropriate, between the diffuser and the liquid crystal display. They serve the purpose of concentrating the light of the background lighting in a narrower solid angle and consequently of increasing the brightness inside the viewing angle range. The mercury-free filling of the flat lamp permits an instant start without a starting performance. This also renders it possible even in the case of short term non-use of the display device, for example during a break in work, to switch off the flat lamp, and consequently to save electric energy. It is also advantageous that the proposed liquid crystal display device manages without external reflectors and light conducting devices, as a result of which the number of components, and consequently the system costs, are reduced.

DESCRIPTION OF THE DRAWINGS

The invention is to be explained in more detail below with the aid of an exemplary embodiment. In the drawing:

FIGS. 3*a*, 3*b* show in a diagrammatic representation a top view and side view, of a flat fluorescent lamp which emits white light during operation. It is conceived as background lighting for an LCD (Liquid Crystal Display).

Figure 1:
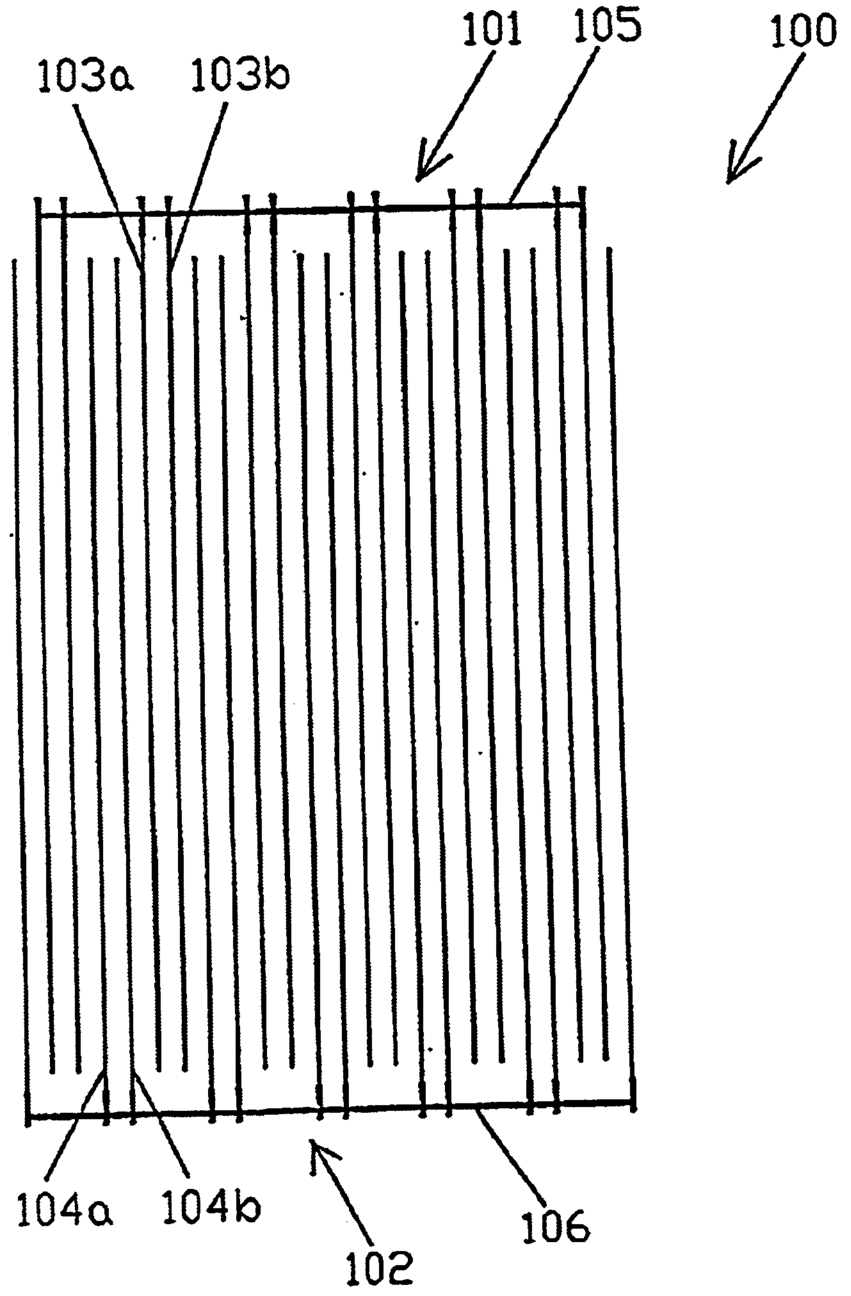
FIG. 1 shows the principle of an electrode structure according to the invention for a discharge, impeded at two ends.

The flat lamp 1 comprises a flat discharge vessel 2 with a rectangular base face, four strip-like metallic cathodes 3, 4 (−) and dielectrically impeded anodes (+), of which three are constructed as elongated double anodes 5 and two are constructed as individual strip-like anodes 6. The discharge vessel 2 for its part comprises a base plate 7, a top plate 8 and a frame 9. The base plate 7 and top plate 8 are connected in a gas-tight fashion to the frame 9 by means of glass solder 10 in such a way that the interior 11 of the discharge vessel 2 is of cuboid construction. The base plate 7 is larger than the top plate 8 in such a way that the discharge vessel 2 has a free standing circumferential edge. The inner wall of the top plate 8 is coated with a mixture of fluorescent materials (not visible in the representation), which converts the UV/VUV radiation generated by the discharge into visible white light. This is a three-band fluorescent material having the blue component BAM ($BaMgAl_{10}O_{17}$: $Eu^{2+}$), the green component LAP ($LaPO_4$: [$Tb^{3+}$, $Ce^{3+}$]) and the red component YOB ([Y, Gd] $BO_3$: $EU^{3+}$). The cut-out in the top plate 8 serves solely representational aims and exposes the view onto part of the cathodes 3, 4 and anodes 5, 6.

The cathodes 3, 4 and anodes 5,6 are arranged alternately and in parallel on the inner wall of the base plate 7. The anodes 6, 5 and cathodes 3, 4 are extended in each case at one of their ends and, on the base plate 7, guided outwards on both sides from the interior 11 of the discharge vessel 2 in such a way that the associated anodic 12 or cathodic feedthroughs are arranged on mutually opposite sides of the base plate 7. On the edge of the base plate 7, the electrode strips 3, 4, 5, 6 in each case merge into external supply leads on the cathode side 13 or anode side 14. The external supply leads 13, 14 serve as contacts for connection to preferably one pulsed voltage source (not represented). The connection to the two poles of a voltage source is normally done as follows. Firstly, the individual anodic and cathodic supply leads are respectively connected to one another, for example in each case by means of a suitable plug-in connector (not represented) including connecting lines. Finally, the two common anodic or cathodic connecting lines are connected to the two associated poles of the voltage source.

In the interior 11 of the discharge vessel 2, the anodes 5, 6 are completely covered with a glass layer 15, whose thickness is approximately 250 $\mu$m.

The two anode strips 5*a*, 5*b* of each anode pair 5 are widened in the direction of the two edges 16, 17 of the flat lamp 1 which are orientated perpendicular to the electrode strips 3–6, specifically in an asymmetric fashion exclusively in the direction of the respective partner strip 5*b* or 5*a*. The largest mutual spacing between the two strips of each anode pair 5 is approximately 4 mm, the smallest spacing is approximately 3 mm. The two individual anode strips 6 are arranged in each case in the immediate vicinity of the two edges 18, 19 of the flat lamp 1 which are parallel to the electrode strips 3–6.

The cathode strips 3; 4 have nose-like semicircular extensions 20 which face the respectively neighbouring anode 5; 6. As a result of them, there are locally limited intensifications in the electric field and, consequently, the delta-shaped individual discharges (not represented) ignite and burn exclusively at these points. The extensions 20 of the two cathodes 4, which are the direct neighbours of the edges 18, 19 of the flat lamp 1 which are parallel to the electrode strips 3–6, are arranged more densely on the sides, facing these edges 18, 19, and in the direction of the narrow sides of the electrode strips 4, 5 than on the side facing the middle of the flat lamp 1. The spacing between the extensions 20 and the respective directly neighbouring anode strip is approximately 6 mm. The radius of the semicircular extensions 20 is approximately 2 mm.

The individual electrodes 3–6 including the feedthroughs and external supply leads 13, 14 are constructed in each case as functionally differing sections of cohering structures made from silver and resembling conductor tracks. The structures have a thickness of approximately 10 $\mu$m and are applied directly to the base plate 7 by means of silk-screen technology and subsequent burning-in.

A gas filling of xenon with a filling pressure of 10 kPa is located in the interior 11 of the flat lamp 1.

Figure 2:
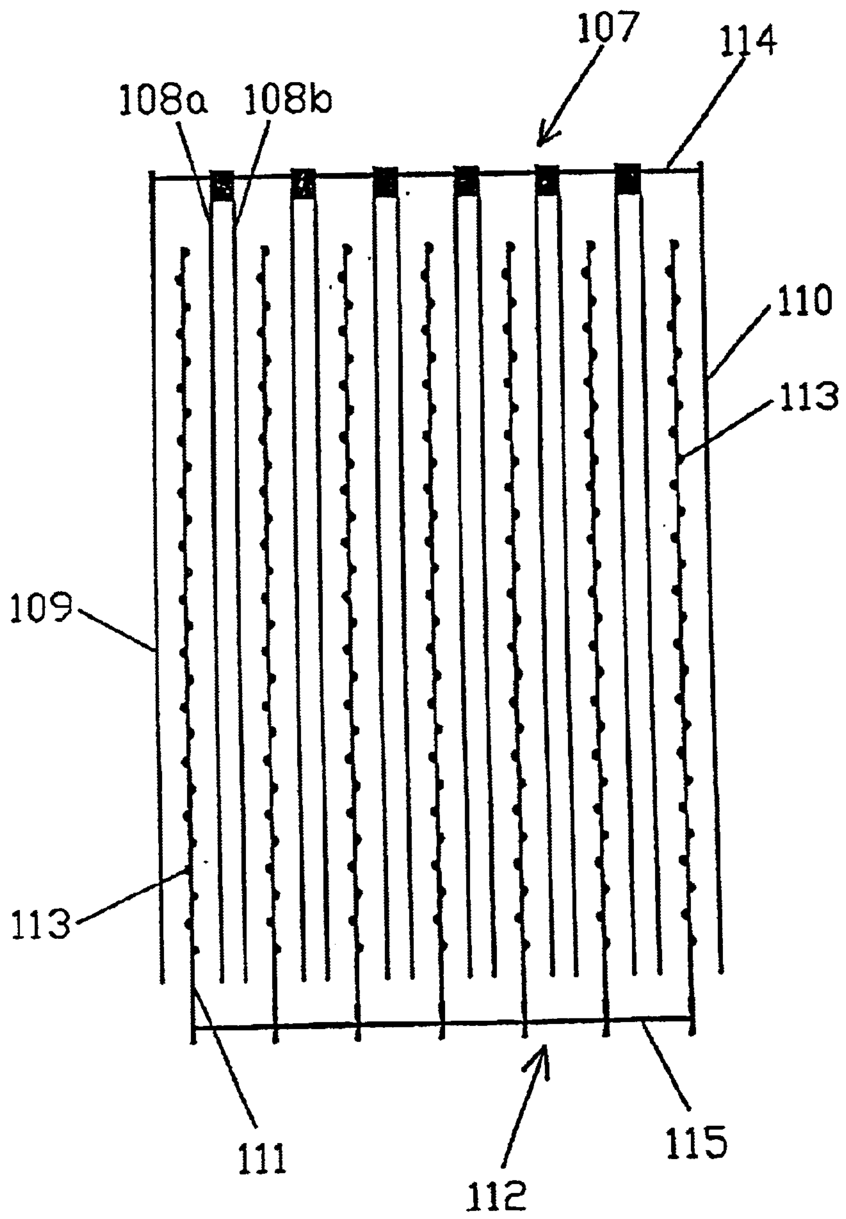
FIG. 2 shows the principle of the relationships of the electrode structure for a flat lamp, preferably to be operated using unipolar voltage pulses, with a diagonal of 6.8"

In one variant (not represented; the embodiment corresponds qualitatively to the representation in FIG. 2) for the background lighting of a 15" monitor, 14 double anode strips and 15 cathodes are arranged alternately on the base plate of a flat fluorescent lamp. A single anode strip in each case forms the two-sided termination of the electrode arrangement. Along their two longitudinal sides, the cathodes have in each case 32 semicircular extensions arranged in a mutually offset fashion. The external dimensions of the lamp are approximately 315 mm·239 mm·10 mm (length·width·height). The wall thickness of the base plate and top plate is in each case approximately 2.5 mm. The frame is made from a glass tube having a diameter of approximately 5 mm. 48 precision glass balls with a diameter of 5 mm are arranged equidistantly as support points between the base plate and top plate. The anode strips and cathode strips open at their alternately opposite ends into an anode-side or cathode-side bus-like external supply lead (compare also FIG. 2). During operation, the anode-side supply lead is connected to the positive terminal (+) and the cathode-side supply lead is connected to the negative terminal (–) of a voltage source supplying unipolar voltage pulses.

Figure 3A:
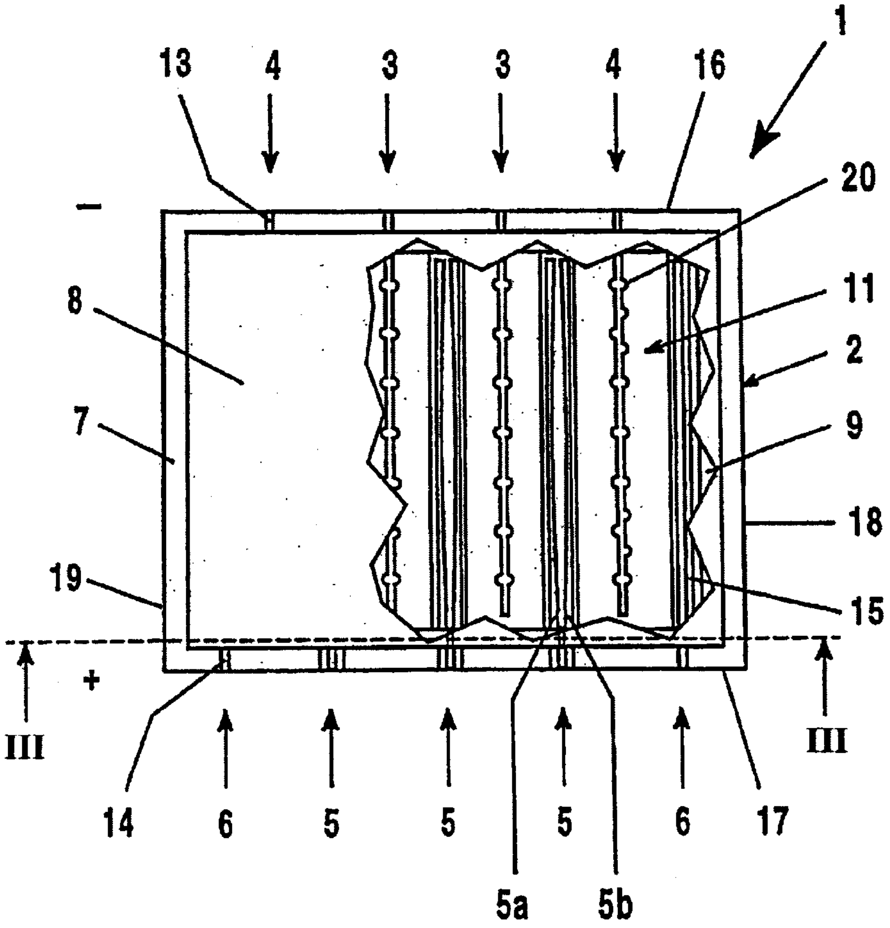
FIG. 3*a* shows a diagrammatic representation of a partly cut away top view of a flat lamp according to the invention having electrodes arranged on the base plate.
Figure 4:
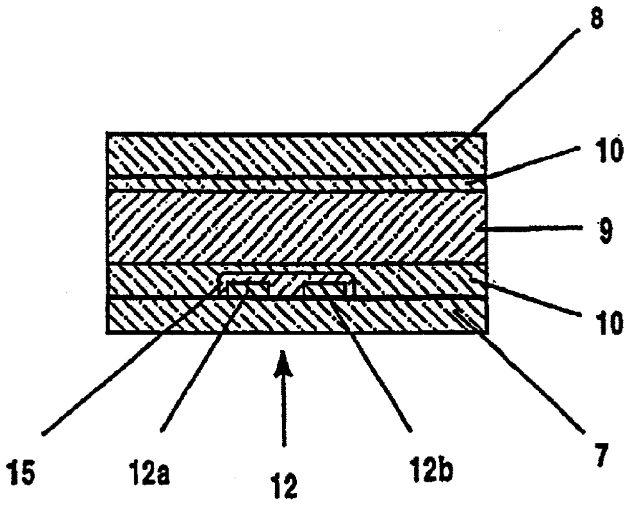
FIG. 4 shows the sectional representation of the feedthrough of a double anode.

A part of a sectional representation along the line III—III (compare FIG. 3*a*) is shown diagrammatically in FIG. 4. Identical features are provided with identical reference numerals. The part represented comprises by way of example the feedthrough 12 of a double anode 5. With the remaining electrodes, the structure is the same in principle. The two feedthrough strips 12*a*, 12*b* are applied directly to the base plate 7 and are, furthermore, completely covered with the glass layer 15. The base plate 7 with the feedthrough 12 including the glass layer 15 are, in turn, connected to the frame 9 in a gas-tight fashion by means of glass solder 10. The top plate 8 is likewise connected in a gas-tight fashion to the frame 9 to the discharge vessel 2 by means of glass solder 10.

Figure 5:
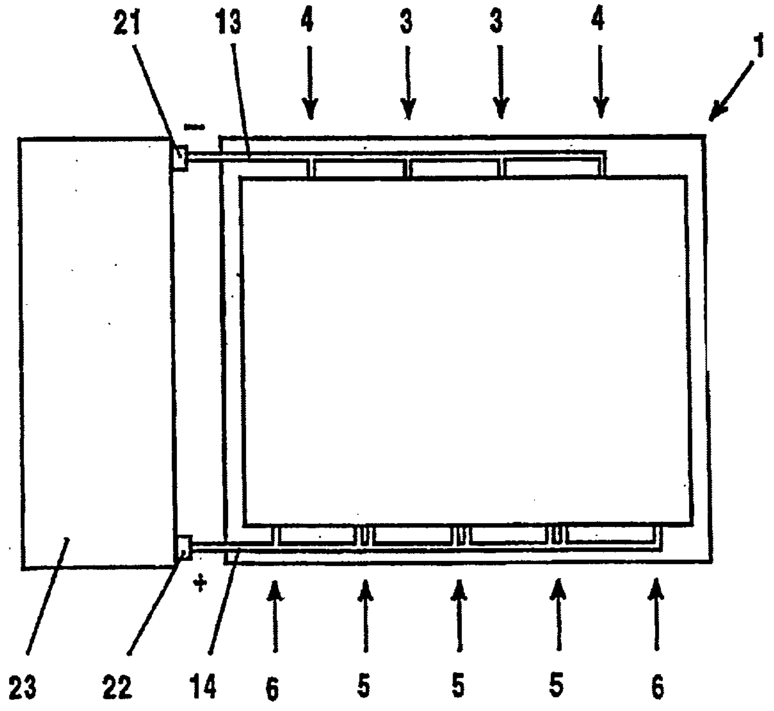
FIG. 5 shows a flat lamp with a pulsed voltage source.

To operate the flat lamp 1, the cathodes 3, 4 and anodes 5, 6 are connected in FIG. 5 to in each case one terminal 21, 22 of a pulsed voltage source 23 via the supply leads 13 and 14, respectively. During operation, the pulsed voltage source supplies unipolar voltage pulses, which are separated from one another by pauses. A pulsed voltage source suitable for this purpose is described in German Patent Application P19548003.1. In this case, a multiplicity of individual discharges (not represented) are formed, which burn between the extensions 20 of the respective cathode 3; 4 and the corresponding directly neighbouring anode strip 5, 6.

Figure 6A:
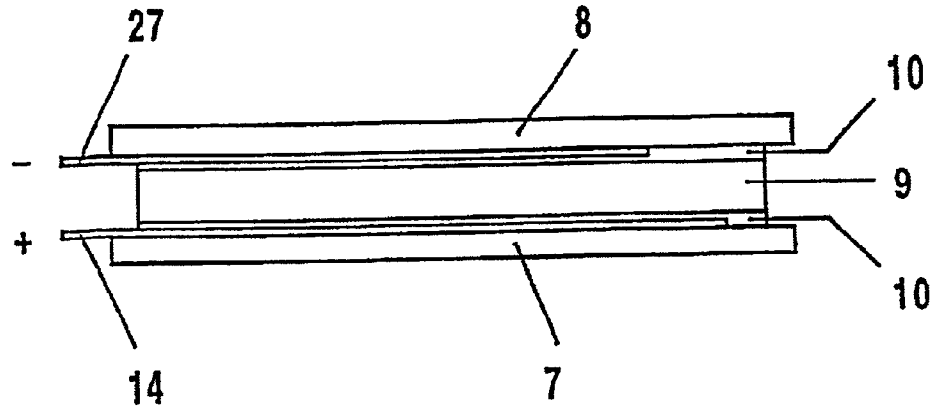
FIG. 6*a* shows a diagrammatic representation of a side view of a flat lamp having electrodes arranged both on the base plate and on the top plate.
Figure 6B:
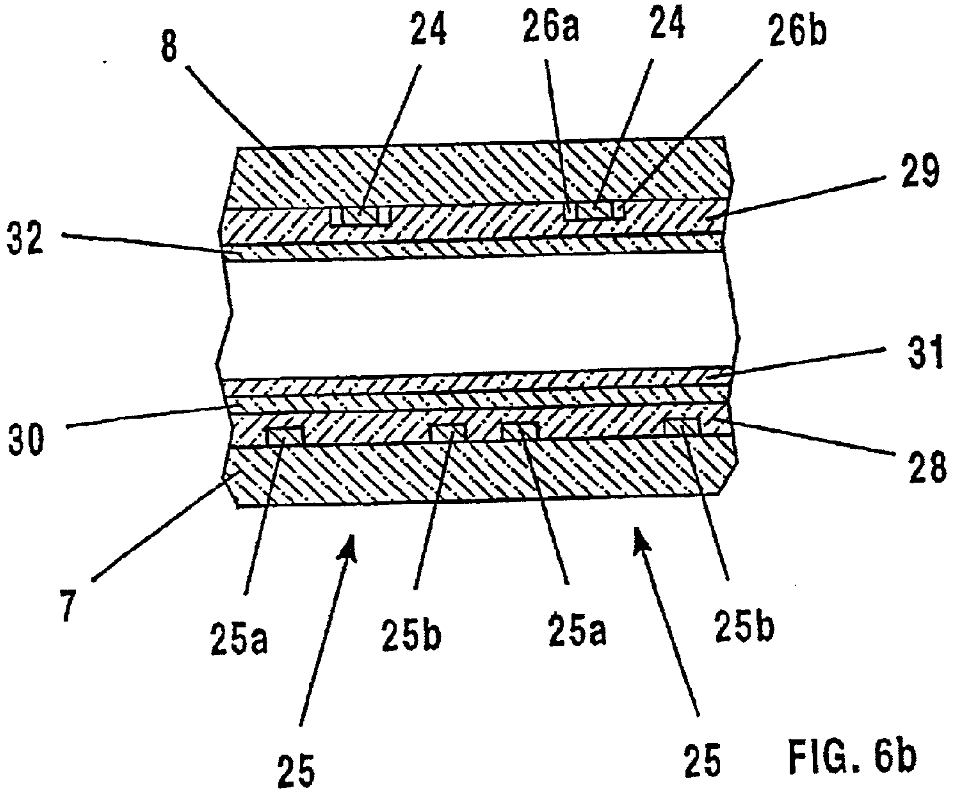
FIG. 6*b* shows a partial sectional representation of a few feedthroughs of the flat lamp in FIG. 6*a,*

FIGS. 6*a* and 6*b* show in a diagrammatic representation a side view and, respectively, a partial section perpendicular to the electrodes of a further variant of the flat fluorescent lamp of FIG. 3*a*. Here, the cathodes 24 are applied to the inner wall of the top plate 8. Each cathode 24 is assigned an anode pair 25*a*, 25*b* in such a way that, viewed in cross-section of FIG. 6*b*, in each case the imaginary connection of cathodes 24 and corresponding anodes 25*a*, 25*b* yield the shape of a "V" standing on its head. The approximate spacings between the cathodes 24, between the individual anodes 25*a*, 25*b* of the corresponding anode pairs one from another, as well as in each case between the mutually neighbouring corresponding anode pairs are 22 mm, 18 mm and 4 mm, respectively. Along their two longitudinal sides and at a mutual spacing of approximately 10 mm, the cathodes 24 in each case have nose-like semicircular extensions 26*a*, 26*b*. During operation, individual discharges start at these extensions 26*a*, 26*b* and burn to their associated anode strips 25*a* and 25*b*, respectively. The part represented comprises by way of example only two cathodes 24 with their respectively associated anode pair 25*a*, 25*b*. The structure and the principle of the arrangements are identical in the case of the remaining electrodes. Cathodes 24 and anodes 25*a*, 25*b* are guided outwards on the same narrow side of the fluorescent lamp, and merge on the corresponding edge of the top plate 8 or base plate 7 into the cathode-side 27 or anode-side 14 external supply lead. As is to be seen in the sectional representation (FIG. 6*b*), both the anodes 25*a*, 25*b* and the cathodes 24 are completely covered with a dielectric layer 28 or 29 (discharge dielectrically impeded at two ends), which extends over the complete inner wall of the base plate 7 or top plate 8. One light-reflecting layer 30 made from $Al_2O_3$ or $TiO_2$ each is applied to the dielectric layer 28 of the base plate 7. Following as last layer thereupon and also on the dielectric layer 29 of the top plate 8 is a layer of fluorescent materials 31 or 32 made from a BAM, LAP, YOB mixture.

Figure 7:
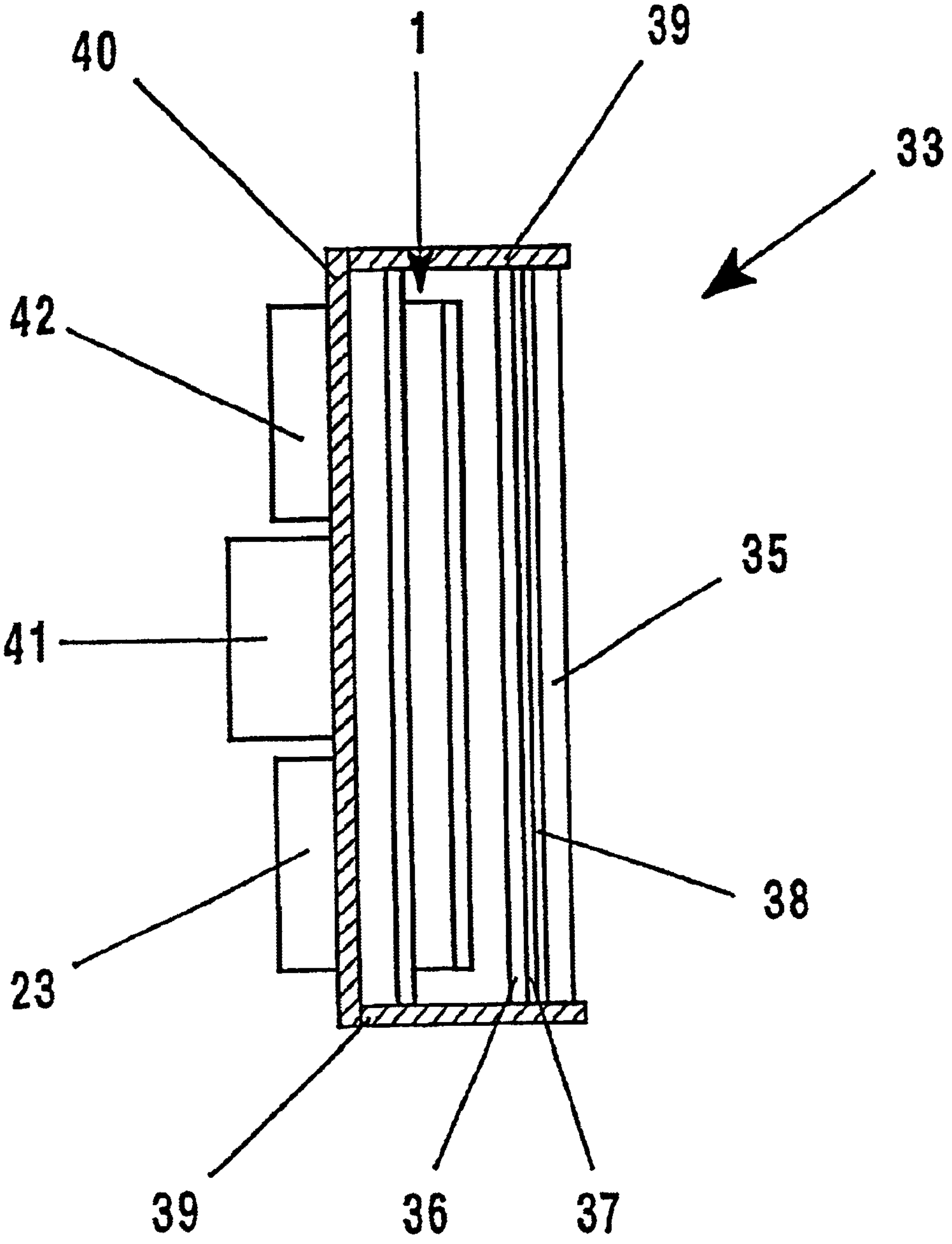
FIG. 7 shows a liquid crystal display device according to the invention, including a flat lamp.

FIG. 7 shows a diagrammatic side view, partly in section, of a liquid crystal display device 33, with the flat fluorescent lamp 1 according to FIG. 1*a* as background lighting for a liquid crystal display 35 known per se. A diffusing screen 36 as optical diffuser is arranged between the flat fluorescent lamp 1 and the liquid crystal display 35. Two light amplifying films (BEF) 37, 38 from the 3M company are arranged between the diffusing screen 36, and the liquid crystal display 35. The flat fluorescent lamp 1, the diffusing screen 36, the two light amplifying films 37, 38 and the liquid crystal display 35 are arranged in a housing and held by the frame 39 of the housing. A heat sink 41 is arranged on the outside of the rear wall 40 of the housing. Moreover, the circuit arrangement 23, connected to the flat fluorescent lamp 34, in accordance with FIG. 5 and an electronic drive system 42 which is known per se and connected to the liquid crystal display 35 are arranged on the outside of the rear wall 40 of the housing. Reference may be made to EP 0 607 453 for further details regarding a suitable liquid crystal display 35 with an electronic drive system 42.

Figure 3B:
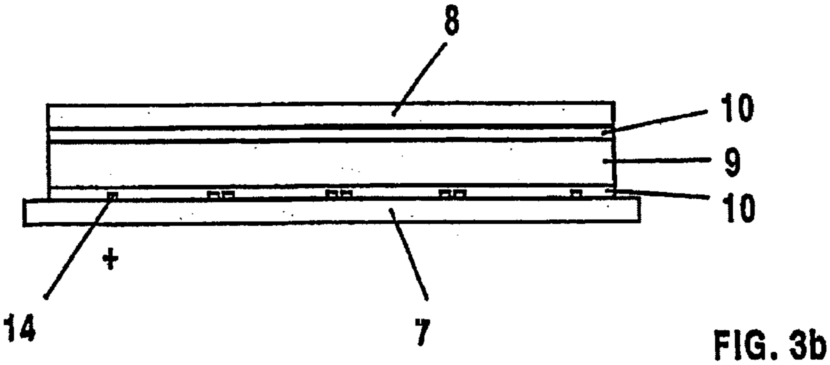
FIG. 3*b* shows a diagrammatic representation of a side view of the flat lamp of FIG. 3*a,*
Figure 8A:
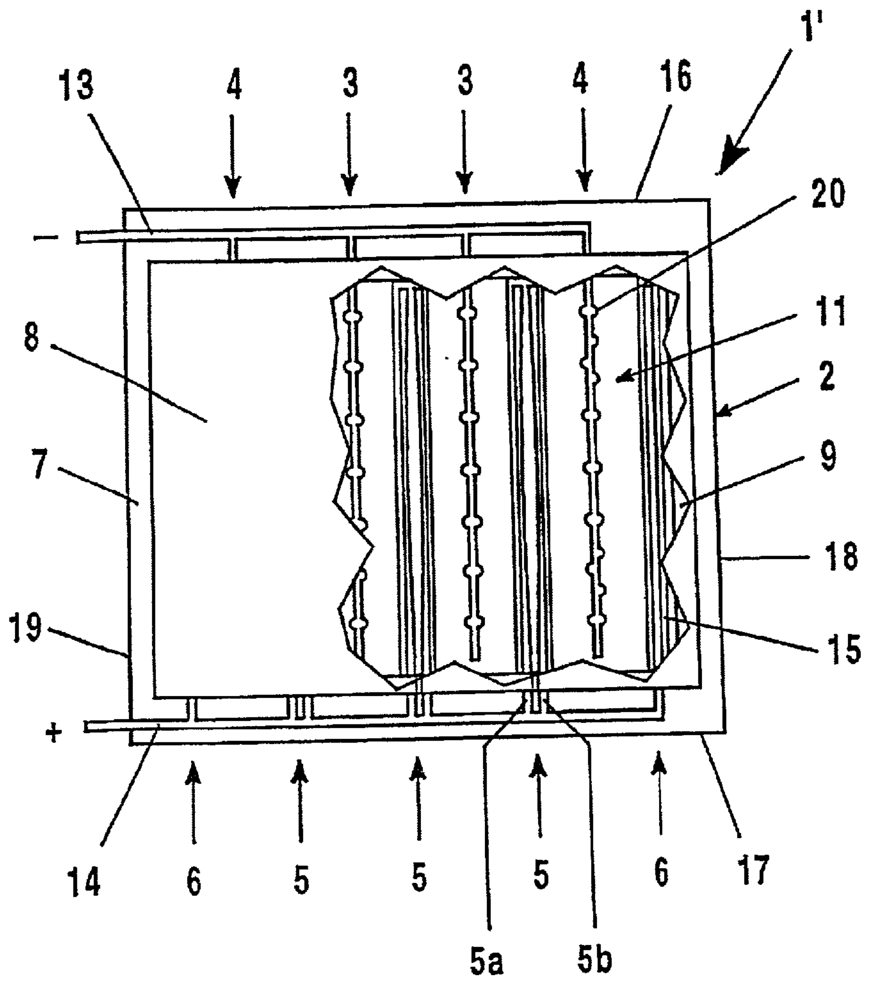
FIG. 8*a* shows a diagrammatic representation of a partially cut away top view of a further flat lamp according to the invention having electrodes arranged on the base plate.
Figure 8B:
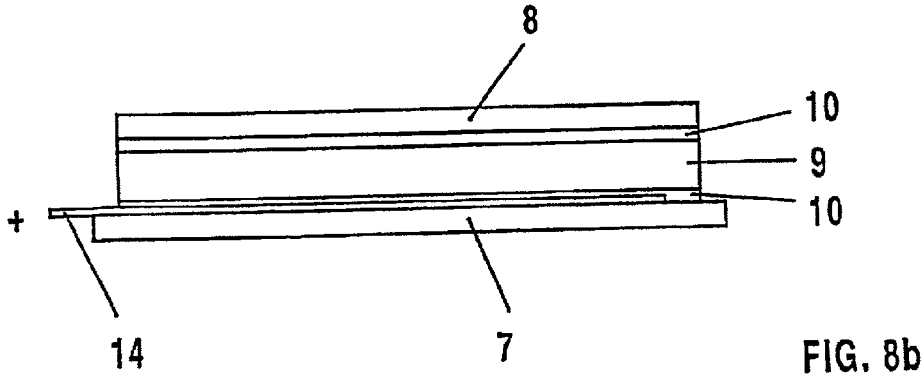
FIG. 8*b* shows a diagrammatic representation of a side view of the flat lamp in FIG. 8*a*.

The flat lamp 1' represented diagrammatically in top view and side view in FIGS. 8*a*–8*b* differs from the flat lamp 1 (FIGS. 3*a* and 3*b*) only in the shaping of the external supply lead 12; 13. The feedthroughs 10; 11 of each electrode strip 3; 4 are firstly extended on the edge of the base plate 5 and open into a cathode-side 12 or anode-side 13 bus-like conductor track. The ends (+, –) of these conductor tracks 12; 13 serve as external contacts for connection to an electric voltage source (not represented).

Figure 9:
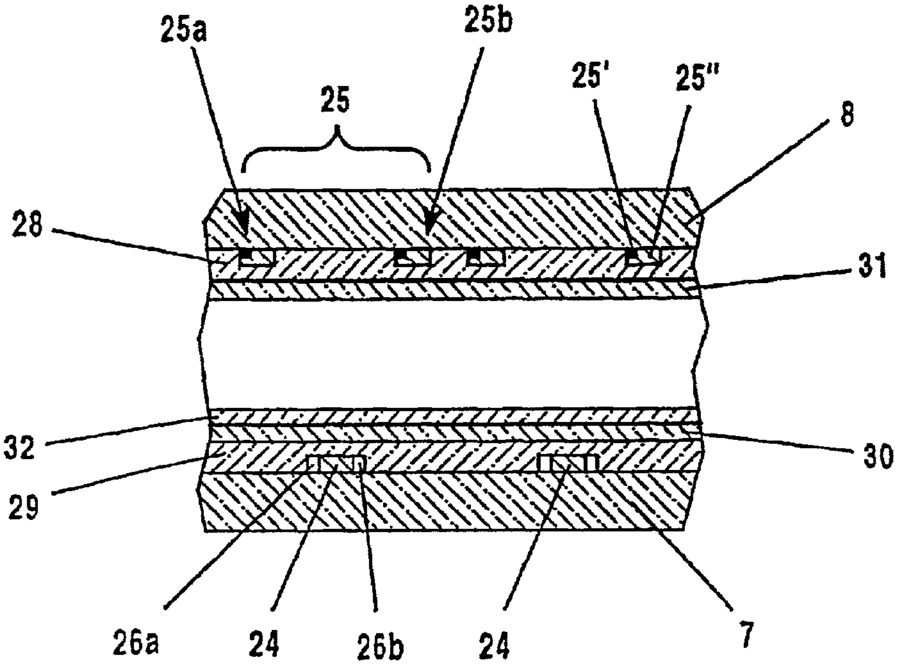
FIG. 9 shows a partial sectional representation of a flat lamp having bipartite anodes.

FIG. 9 shows a diagrammatic partial sectional representation of a further variant of the flat lamp. It differs from that represented in FIG. 6*b* essentially in that the anodes 25*a* or 25*b* of each anode pair 25 are of bipartite design. They comprise in each case a narrow silver strip 25' and a wider transparent indium tin oxide strip 25", with a silver strip 25' being embedded in the indium tin oxide strip 25". In this way, the shading by the anodes on the top plate is reduced, that is to say the effective transparency of the latter for the useful light is increased.

The invention is not limited by the specified exemplary embodiments. Features of different exemplary embodiments can also be combined, in addition.

What is claimed is:

1. A liquid crystal display device (33) having a liquid crystal display (35), an electronic drive system (42) for driving the liquid crystal display (35), a lighting system as background lighting for the liquid crystal display (35), a receptacle (39) in which the liquid crystal display (35) is arranged with the electronic drive system (42) and dew lighting system;

the lighting system having a flat fluorescent lamp (1) and having an electric voltage source (23) which is connected to the flat fluorescent lamp (1) in an electrically conducting fashion and is suitable for injecting into the flat fluorescent lamp (1) effective power pulses separated from one another by pauses during operation;

the flat fluorescent lamp having an at least partially transparent discharge vessel (2) which is closed, flat and filled with a gas filling and consists of electrically non-conducting material, which discharge vessel (2) has an its inner wall at least in part a layer of a fluorescent material or a mixture of fluorescent materials, and having strip-like electrodes (3–6) arranged on the inner wall of the discharge vessel (2), at least the anodes (5, 6) being covered in each case with a dielectric layer (15);

the discharge vessel comprising a base plate (7), a top plate (8) and a frame (9), the base plate (7), the top plate (8) and the frame (9) being interconnected in a gas-tight fashion by means of solder (10); and the strip-like electrodes (3–6) merging into feedthroughs (12) which merge into external supply leads (13, 14) in such a way that the electrodes (3–6), feedthroughs (12) and external supply leads (13, 14) are constructed a structures (3, 4, 13; 5, 6, 14) resembling a conductor track, the feedthroughs being guided outwards and covered in a gas-tight fashion, and the external supply leads (13, 14) immediately adjacent thereto serving to connect to an electric supply source.

2. Liquid crystal display device according to claim 1, characterized in that at least one optical diffuser (36) is arranged between the flat lamp (1) and liquid crystal display (35).

3. Liquid crystal display device according to claim 1, characterized in that at least one light amplifying film (37, 38) BEF (Brightness Enhancement Film) is arranged between the flat lamp (1) and liquid crystal display (35).

4. Liquid crystal display device according to claim 1, characterized in that arranged between the flat lamp and liquid crystal display are firstly a first optical diffuser, thereafter a light amplifying film and, finally, a second optical diffuser.

* * * * *